United States Patent
Hui et al.

(10) Patent No.: US 9,413,643 B2
(45) Date of Patent: *Aug. 9, 2016

(54) SEAMLESS MULTIPATH RETRANSMISSION USING SOURCE-ROUTED TUNNELS

(71) Applicant: Cisco Technology, Inc., San Jose, CA (US)

(72) Inventors: Jonathan W. Hui, Belmont, CA (US); Jean-Philippe Vasseur, Anchorage, AK (US); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/842,240

(22) Filed: Sep. 1, 2015

(65) Prior Publication Data

US 2015/0372903 A1    Dec. 24, 2015

Related U.S. Application Data

(63) Continuation of application No. 13/669,210, filed on Nov. 5, 2012, now Pat. No. 9,154,370.

(51) Int. Cl.
| | |
|---|---|
| *H04L 12/66* | (2006.01) |
| *H04L 12/703* | (2013.01) |
| *H04L 29/14* | (2006.01) |
| *H04L 12/947* | (2013.01) |
| *H04L 12/733* | (2013.01) |
| *H04L 12/707* | (2013.01) |
| *H04L 12/721* | (2013.01) |
| *H04L 29/12* | (2006.01) |
| *H04L 29/06* | (2006.01) |

(52) U.S. Cl.
CPC ............... *H04L 45/28* (2013.01); *H04L 29/14* (2013.01); *H04L 45/20* (2013.01); *H04L 45/22* (2013.01); *H04L 45/34* (2013.01); *H04L 49/25* (2013.01); *H04L 61/2592* (2013.01); *H04L 69/22* (2013.01); *H04L 2212/00* (2013.01)

(58) Field of Classification Search
None
See application file for complete search history.

(56) References Cited

U.S. PATENT DOCUMENTS

| | | |
|---|---|---|
| 7,330,440 B1 | 2/2008 | Bryant et al. |
| 7,362,709 B1 | 4/2008 | Hui et al. |
| 7,496,650 B1 | 2/2009 | Previdi et al. |
| 7,583,589 B2 | 9/2009 | Bryant et al. |

(Continued)

OTHER PUBLICATIONS

A. Conta & S. Deering, Request for Comments (RFC) 2473: "Generic Packet Tunneling in IPv6 Specification" (Dec. 1998).

(Continued)

*Primary Examiner* — Kevin C Harper
(74) *Attorney, Agent, or Firm* — Parker Ibrahim & Berg LLC; James M. Behmke; Stephen D. LeBarron

(57) ABSTRACT

In one embodiment, a device receives a destination unreachable message originated by a particular node along a first source route, the message carrying an encapsulated packet as received by the particular node. In response, the device may determine a failed link along the first source route based on a tunnel header and the particular node. Once determining an alternate source route without the failed link, the device may re-encapsulate and re-transmit the original packet on an alternate source route with a new tunnel header indicating the alternate source route (e.g., and a new hop limit count for the tunnel header and an adjusted hop limit count in the original packet).

18 Claims, 7 Drawing Sheets

(56) References Cited

U.S. PATENT DOCUMENTS

| | | | |
|---|---|---|---|
| 7,583,593 | B2 | 9/2009 | Guichard et al. |
| 7,613,200 | B1 | 11/2009 | Williams, Jr. et al. |
| 7,647,426 | B2 | 1/2010 | Patel et al. |
| 7,707,307 | B2 | 4/2010 | Miles et al. |
| 7,801,021 | B1 | 9/2010 | Triantafillis et al. |
| 7,885,179 | B1 | 2/2011 | Bryant et al. |
| 8,238,232 | B2 | 8/2012 | Bryant et al. |
| 9,154,370 | B2 * | 10/2015 | Hui ................... H04L 29/14 |
| 2002/0141448 | A1 | 10/2002 | Matsunaga |
| 2003/0108029 | A1 | 6/2003 | Behzadi |
| 2003/0110287 | A1 | 6/2003 | Mattson |
| 2004/0132451 | A1 | 7/2004 | Butehorn et al. |
| 2005/0086367 | A1 | 4/2005 | Conta et al. |
| 2009/0322510 | A1 | 12/2009 | Berger et al. |
| 2012/0110393 | A1 | 5/2012 | Shieh et al. |
| 2013/0051250 | A1 | 2/2013 | Shaffer et al. |

OTHER PUBLICATIONS

Conta et al., "Internet Control Message Protocol (ICMPv6) for the Internet Protocol Version 6 (IPv6) Specification", Internet Engineering Task Force, Network Working Group, Request for Comments 4443, Mar. 2006, 24 pages.

Deering et al., "Internet Protocol, Version 6 (IPv6) Speficiation", Internet Engineering Task Force, Network Working Group, Request for Comments 2460, Dec. 1998, 39 pages.

Hui et al., "An IPv6 Routing Header for Source Routes with the Routing Protocol for Low-Power and Lossy Networks (RPL)", Internet Engineering Task Force, Request for Comments 6554, Mar. 2012, 13 pages.

Winter et al., "RPL:IPv6 Routing Protocol for Low-Power and Lossy Networks", IETF Request for Comments 6550, Mar. 2012, 157 pages.

* cited by examiner

SEAMLESS MULTIPATH RETRANSMISSION USING SOURCE-ROUTED TUNNELS

CROSS-REFERENCE TO RELATED APPLICATIONS

This Application is a Continuation Application of U.S. patent application Ser. No. 13/669,210, filed Nov. 5, 2012, the entire content of which is herein incorporated by reference.

TECHNICAL FIELD

The present disclosure relates generally to computer networks, and, more particularly, to retransmission of packets sent within source-routed tunnels.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Since link failures are relatively common in LLNs, for storing mode, RPL specifies a backtracking mechanism that allows routers to try/explore alternate paths when a link on the preferred path fails. This example backtracking mechanism logically follows a depth-first search along the DAG by forwarding the data packet itself. As the data packet finds downward routes that are broken, the link is marked down, the downward routing entry is invalidated, and the router attempts a different next-hop route in the downward direction. If no more downward next-hops are available, the router returns the packet upwards to its DAG parent, which is the backtracking.

For non-storing mode, RPL does not currently specify a similar mechanism to apply backtracking to source-routed messages. As such, when source-routing is employed, rerouting must generally occur at the source of the message (by default).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
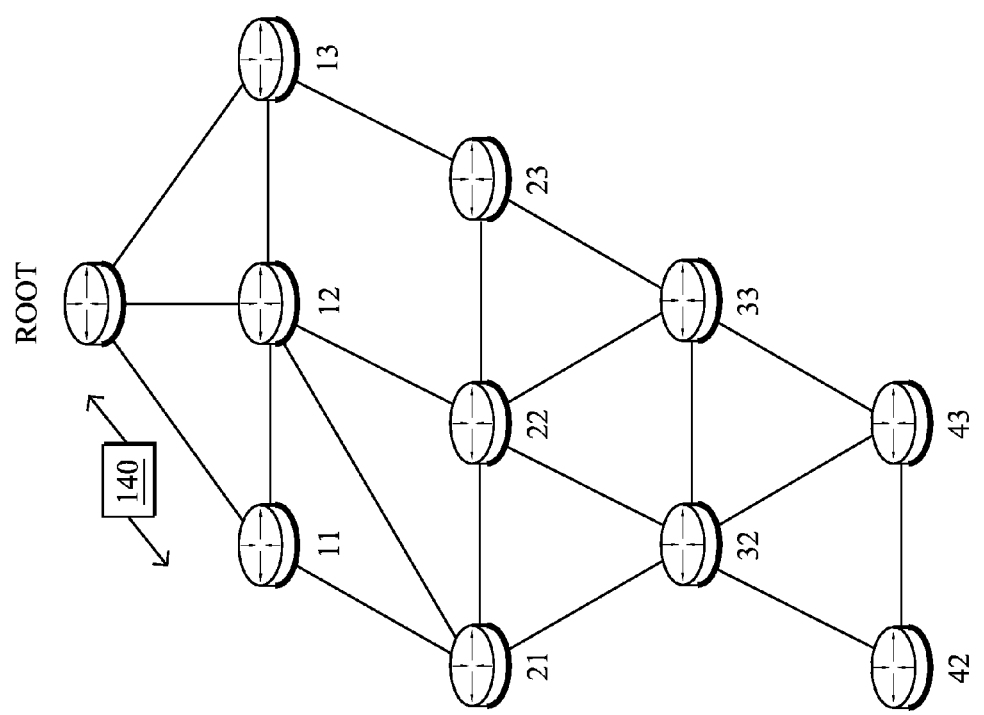
FIG. 1 illustrates an example communication network.

According to one or more embodiments of the disclosure, a device (e.g., a root node) encapsulates and transmits an original packet toward a destination in a computer network, where the original packet is encapsulated with a tunnel header indicating a first source route toward the destination. In response to receiving a destination unreachable message originated by a particular node along the first source route, the destination unreachable message carrying the encapsulated packet as received by the particular node, the device may determine a failed link along the first source route based on the tunnel header and the particular node. Once determining an alternate source route to the destination without the failed link, the device may re-encapsulate and re-transmit the original packet on an alternate source route, where the original packet is re-encapsulated with a new tunnel header indicating the alternate source route (e.g., and a new hop limit count for the tunnel header and an adjusted hop limit count in the original packet).

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "43," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
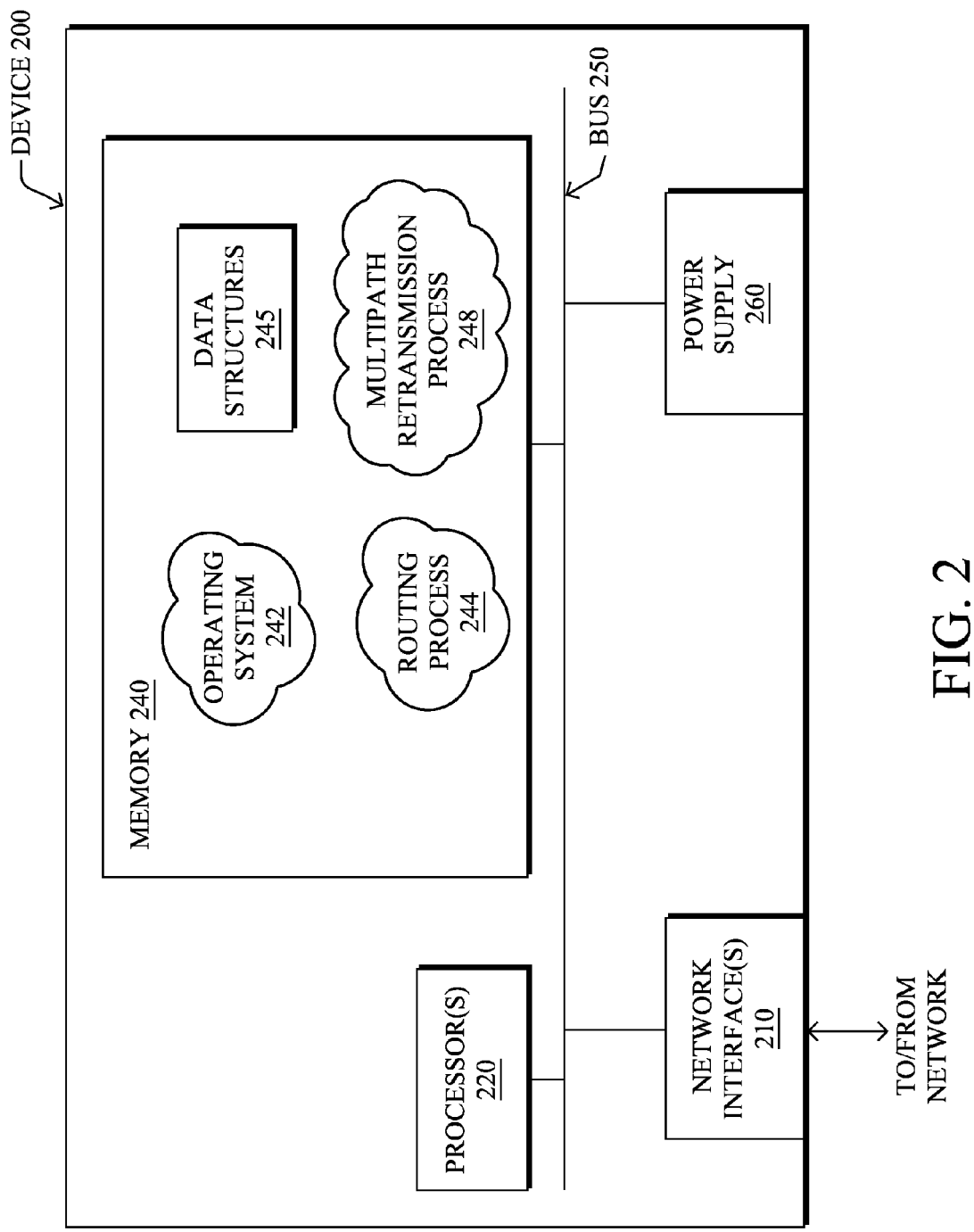
FIG. 2 illustrates an example network device/node.

FIG. 2 is a schematic block diagram of an example node/device 200 that may be used with one or more embodiments described herein, e.g., particularly as a FAR or root node as shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "multipath retransmission" process 248, as described herein. Note that while multipath retransmission process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

As noted above, since link failures are relatively common in LLNs, for storing mode, RPL (RFC 6550) specifies a backtracking mechanism that allows routers to try/explore alternate paths when a link on the preferred path fails. This example backtracking mechanism logically follows a depth-first search along the DAG by forwarding the data packet itself. As the data packet finds downward routes that are broken, the link is marked down, the downward routing entry is invalidated, and the router attempts a different next-hop route in the downward direction. If no more downward next-hops are available, the router returns the packet upwards to its DAG parent, which is the backtracking.

In a companion specification to RPL, RFC 6554, entitled "An IPv6 Routing Header for Source Routes with the Routing Protocol for Low-Power and Lossy Networks (RPL)" by Hui et al. (March 2012), defines how to:
1) Insert a compressible IPv6 Source Route using IPv6-in-IPv6 tunneling;
2) Send an Internet Control Message Protocol version 6 (ICMPv6) Destination Unreachable message back to the tunnel source (i.e. DAG Root) when a RPL router cannot deliver the message to its next hop; and
3) Update the tunnel header and original packet's IPv6 Hop Limit values so that each RPL hop is visible outside the RPL routing domain (e.g., "traceroute6" will show each hop towards a destination within the RPL domain).

Unfortunately, for non-storing mode, RPL, or more particularly RFC 6554, does not currently specify a similar mechanism to apply backtracking to source-routed messages. As such, when source-routing is employed, rerouting must generally occur at the source of the message (by default).

Seamless Multipath Retransmission

The techniques herein provide a seamless recovery mechanism for non-storing mode (or source routing in general) when forwarding source-routed packets. A capable device, such as a FAR or DAG root, implementing the techniques herein may process an ICMPv6 Destination Unreachable message to not only invalidate downward routes but also to recover the original packet (by restoring the IPv6 Hop Limit). As described below, the FAR may also fragment the original packet to allow enough space for adding the ICMPv6 Destination Unreachable header, and may selectively indicate what messages should be retransmitted, indicating to LLN devices how much of the original packet to include in the ICMPv6 Destination Unreachable message.

Note that the techniques herein work with mechanisms necessary to implement source routing (e.g., most specifically, IPv6-in-IPv6 tunneling). Traditionally, an IPv6-in-IPv6 tunnel appears as a single IPv6 hop between the two ends of the tunnel. RFC 6554 specifies how the tunnel header and original packet's header may be modified to expose every router that the tunnel traverses. Unfortunately, RFC 6554 does not specify how to apply retransmission techniques in a way that is not visible to devices outside the RPL network. That is, at a high level, devices outside should not be able to observe the fact that messages are being retransmitted in order to reach the destination, other than some observable increase in latency. This is important because the source device may have some pre-conceived notion on the maximum path length and set its IPv6 Hop Limit accordingly. If the source does not give any leeway, small Hop Limit values could prevent any retransmission policy by the FAR. Source routing makes this scenario even more likely since the original packet may travel several hops away from the FAR before reaching a broken link. (Said differently, without prior knowledge of the RPL topology, traceroute6 should appear to work as normal.)

Illustratively, the techniques described herein may be performed by hardware, software, and/or firmware, such as in accordance with the multipath retransmission process 248, which may contain computer executable instructions executed by the processor 220 (or independent processor of interfaces 210) to perform functions relating to the techniques described herein, e.g., in conjunction with routing process. For example, the techniques herein may be treated as extensions to conventional protocols, such as RFC 6554, and as such, may be processed by similar components understood in the art that execute those protocols, accordingly.

Operationally, the techniques herein illustratively utilize the concept of the ICMPv6 Destination Unreachable message that is specified in RFC 6554. The. When a FAR or DAG root needs to deliver a datagram to an LLN device, the FAR needs to insert a Source Route Header (SRH) that specifies only a strict source-route (path) to the intended destination. To avoid Path maximum transmission unit (MTU) issues, RFC 6554 requires the FAR to utilize IPv6-in-IPv6 tunneling and include the SRH in the tunnel header. By ensuring that the SRH does not specify more hops than the original packet's IPv6 Hop Limit value and decrementing the original packet's IPv6 Hop Limit by the number of hops along the path, the destination will process the original packet as if no IPv6-in-IPv6 tunneling ever took place. Similarly, because the SRH respects the original packet's IPv6 Hop Limit, intermediate routers will properly generate an ICMPv6 Time Exceeded error, allowing applications such as "traceroute6" to function as if no IPv6-in-IPv6 tunneling took place.

Figure 3:
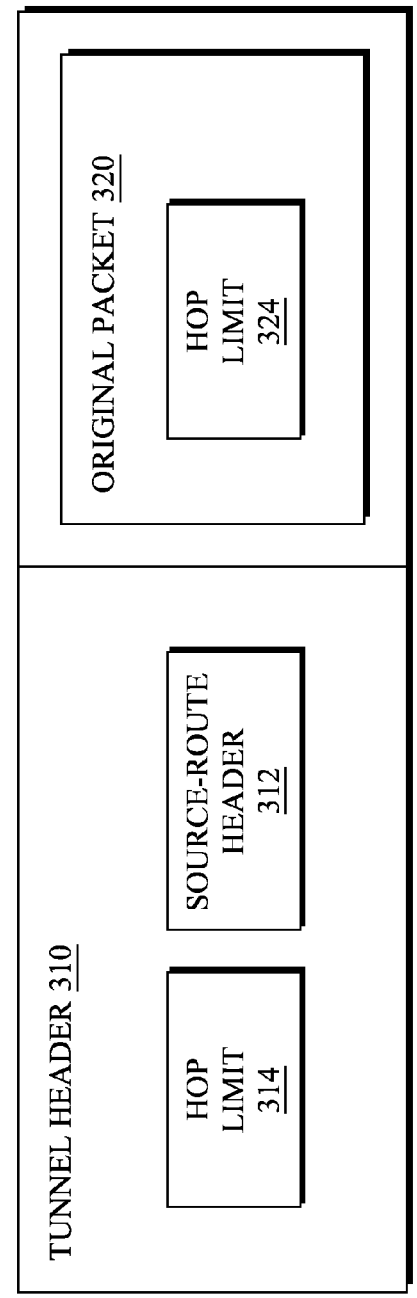
FIG. 3 illustrates an example message format.
Figure 4:
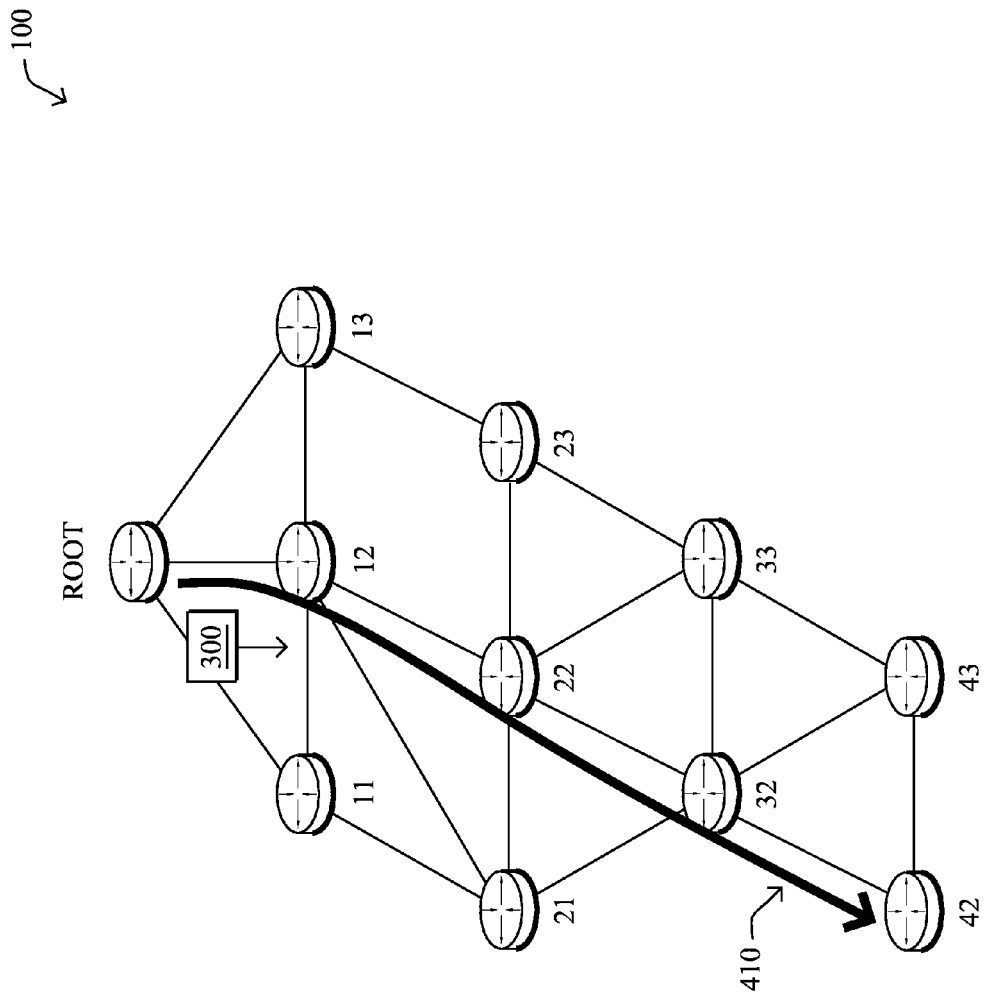
FIG. 4 illustrates an example of a source route path.

Said differently, and with reference to FIGS. 3 and 4, a capable device such as a FAR or DAG root may encapsulate and transmit (within packet/message 300) an original packet 320 toward a destination (e.g., node 42) in a computer network 100. In particular, the original packet 320 may be encapsulated with a tunnel header 310 indicating a first source route (SRH) 312 toward the destination, such as path 410 in FIG. 4 (source-route being Root-12-22-32-42). The tunnel header 310 also has a hop limit count 314 related to a number of tunnel hops in the first source route, while the original packet 320 has an adjusted hop limit count 324 set to an original hop limit count of the original packet less the hop limit count 314 of the tunnel header.

Figure 5:
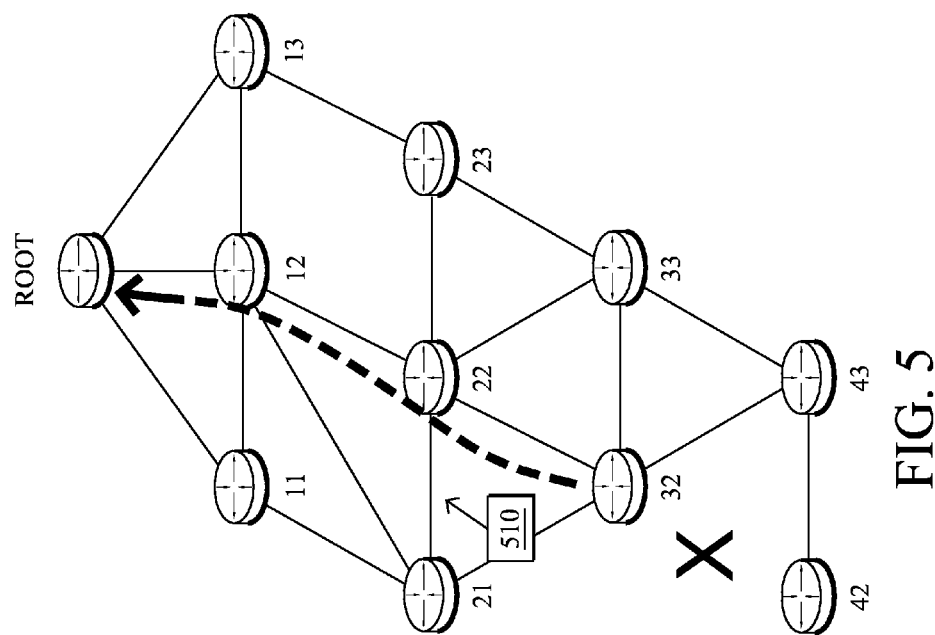
FIG. 5 illustrates an example of a destination unreachable message.

When an intermediate router receives a source-routed message, it parses the SRH, determines the next-hop destination, and attempts to forward the packet to the next hop. If the router cannot forward the datagram to the specified next hop for any reason, such as node 32 as shown in FIG. 5, it generates an ICMPv6 Destination Unreachable message 510 back to the tunnel header's source (e.g., the FAR or DAG Root). In particular, in this manner, the FAR or DAG root receives the destination unreachable message originated by a particular node (e.g., node 32) along the first source route 410, where the destination unreachable message 510 carries the encapsulated packet 300 as received by the particular node. For instance, as specified in RFC 4443, entitled "Internet Control Message Protocol (ICMPv6) for the Internet Protocol Version 6 (IPv6) Specification" by Conta et al. (March 2006), an illustrative ICMPv6 error message must include as much of the error-causing packet in the ICMPv6 payload. Because packets in LLNs rarely come anywhere close to the IPv6 Link MTU, the ICMPv6 Destination Unreachable message will typically contain the entire packet in its payload. (Note that techniques to avoid or address these situations are mentioned below.)

When the FAR or DAG Root receives an ICMPv6 Destination Unreachable message 510, it first processes the SRH 312 to determine the link that failed. The IPv6 Source Address of the ICMPv6 message indicates the router that experienced the failure (e.g., node 32). More importantly, because the ICMPv6 Destination Unreachable message also contains the IPv6-in-IPv6 packet 300 that could not be delivered, the FAR can determine the specific link that failed. Specifically, the next IPv6 Destination Address of the tunnel header specifies the next-hop that failed.

Finally, to recover the original packet, the FAR or DAG Root restores the original packet's IPv6 Hop Limit value by adding back the number of hops in the SRH. In other words, the original hop limit count of the original packet may be restored by adding the adjusted hop limit count of the original packet as found in the received destination unreachable message to the number of tunnel hops in the failed source route.

Figure 6:
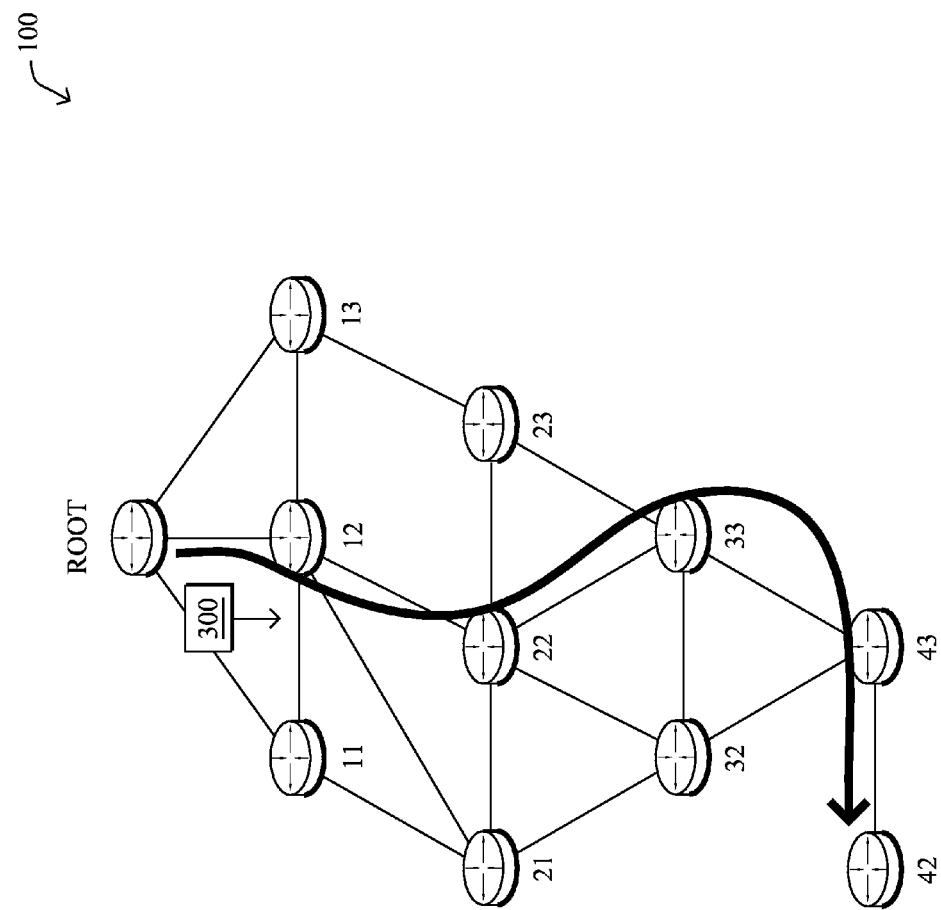
FIG. 6 illustrates an example of an alternate source route path.

With knowledge of which link failed and the recovered original packet, the FAR or DAG Root can then determine (recompute) an alternate source route to reach the destination (i.e., without the failed link). If an alternate source route exists, such as 610 in FIG. 6 (e.g., Root-12-22-33-43-42), the FAR proceeds to forward the packet 300 just as it did the first time it received the original packet 320. That is, the FAR or DAG Root may re-encapsulate and re-transmit the original packet on the alternate source route, where the original packet is re-encapsulated with a new tunnel header indicating the alternate source route and a new hop limit count related to a new number of tunnel hops in the alternate source route. In addition, the original packet has a new adjusted hop limit count 324 set to the restored original hop limit count less the new hop limit count 314 of the new tunnel header 310.

Note that if no alternate source route exists, the FAR may generate an ICMPv6 Destination Unreachable back to the original packet's source and include the original packet in the ICMPv6 payload. In other words, in response to determining that no alternate source route exists, the FAR or DAG Root may return a second destination unreachable message to a source of the original packet, where the second destination unreachable message carries the original packet with the restored original hop limit count.

As mentioned above, if the original packet is too big, the ICMPv6 Destination Unreachable message may only include a portion of the original packet (up to the link MTU). This is because the ICMPv6 Destination Unreachable message typically adds 48 bytes of header overhead. To avoid this situation, the FAR or DAG Root can choose between two methods:

1) Limiting the destination unreachable message in response to the encapsulated packet 300 not fitting within the MTU when carried within the destination unreachable message 510 (e.g., disabling the retransmission mechanism for large packets). In this case, the FAR may include a flag in the SRH that indicates that only the tunnel header and SRH need be included in the ICMPv6 error payload. The tunnel header and SRH are necessary to indicate what link failed. Alternatively, the intermediate router could send back a newly defined ICMPv6 Destination Unreachable error that indicates only what link failed. In this manner, the destination unreachable message is limited to information required to determine the failed link, such as by carrying one of either a) the tunnel header 310 and the failed source route 312; or b) an explicit indication of the failed link.

2) Using IPv6 Fragmentation as specified in RFC 2460 (entitled "Internet Protocol, Version 6 (IPv6) Specification" by Deering et al. (December 1998)) to fragment the original packet and deliver each fragment using IPv6-in-IPv6 tunneling. In doing so, the FAR ensures that each packet has at least 48 bytes less than the link MTU. Said differently, the FAR or DAG root may fragment the original packet 320 based on an MTU in consideration of a destination unreachable message to ensure that the entire original packet plus the tunnel header plus the failed source route fits within the MTU when returned in a destination unreachable message 510.

The choice between the two may be a policy that applies to all packets or else selectively applied based on specific information contained within the packet (e.g., Traffic Class, deep packet inspection, etc.). Note that disabling the retransmission mechanism may be applied to small packets as well, depending on the application. In yet another embodiment the FAR or DAG root may dynamically set a novel flag requesting one of the options above according to its memory state, number of retransmissions of the packet, etc.

Note that when retransmitting the original packet along a different path 610, the original packet 320 is identical to when the FAR or DAG root initially received the original packet. As such, the FAR or DAG root can attempt to deliver the packet along a different path without any visible side effects in the original packet (other than an increase in delivery time).

Also note that the techniques herein may be fully contained within the FAR or DAG root, allowing it to work with any device that implements RFC 6554. Furthermore, the techniques herein are not specific to RPL and can be applied to any routing protocol that may utilize IPv6-in-IPv6 tunneling to deliver the packets.

Figure 7:
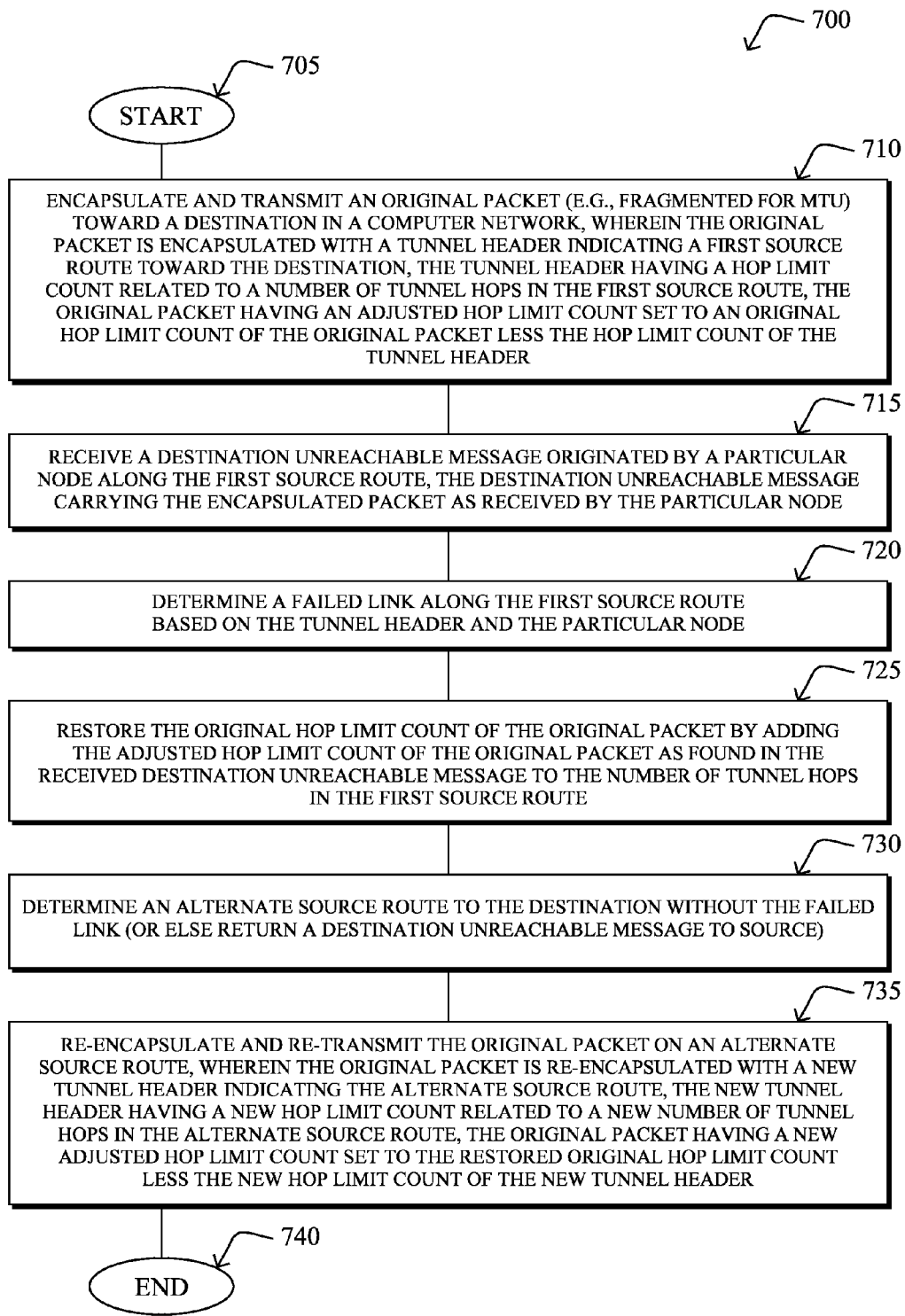
FIG. 7 illustrates an example simplified procedure for seamless multipath retransmission using source-routed tunnels in a communication network.

FIG. 7 illustrates an example simplified procedure 700 for seamless multipath retransmission using source-routed tunnels in a communication network in accordance with one or more embodiments described herein. The procedure 700 may start at step 705, and continues to step 710, where, as described in greater detail above, a capable device such as a FAR or DAG root may encapsulate and transmit an original packet (e.g., fragmented for MTU size) toward a destination in a computer network, wherein the original packet is encapsulated with a tunnel header indicating a first source route toward the destination, the tunnel header having a hop limit count related to a number of tunnel hops in the first source route 410, the original packet having an adjusted hop limit count set to an original hop limit count of the original packet less the hop limit count of the tunnel header. If in step 715 the device later receives a destination unreachable message 510 originated by a particular node along the first source route (carrying the encapsulated packet as received by the particular node), then in step 720 the device may determine a failed link along the first source route based on the tunnel header and the particular node, and restores the original hop limit count of the original packet in step 725 by adding the adjusted hop limit count of the original packet as found in the received destination unreachable message to the number of tunnel hops in the first source route. The device may then determine an alternate source route 610 to the destination without the failed link in step 730 (or else return a destination unreachable message to source), and in step 735 re-encapsulates and re-transmits the original packet on an alternate source route, wherein the original packet is re-encapsulated with a new tunnel header indicating the alternate source route, the new tunnel header having a new hop limit count related to a new number of tunnel hops in the alternate source route, the original packet having a new adjusted hop limit count set to the restored original hop limit count less the new hop limit count of the new tunnel header. The illustrative procedure 700 may then end in step 740.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for seamless multipath retransmission using source-routed tunnels in a communication network. In particular, the techniques herein provide seamless error recovery when forwarding along source routes, particularly downward routes. While RFC 6554 uses IPv6-in-IPv6 tunneling, it exposes every hop to the original packet by adjusting the IPv6 Hop Limit. The techniques herein properly restore the IPv6 Hop Limit value and ensures that there is enough space for ICMPv6 Destination Unreachable messages to deliver the original packet back to the FAR or DAG Root. Furthermore, because the techniques herein are contained within the FAR or DAG root and operate on existing primitives defined in RFC 6554, the techniques are fully compatible with any device that implements RFC 6554.

Finally, because the techniques herein avoid any need to buffer the original packets at the FAR for retransmissions, the techniques herein do not incur any (significant) memory overhead on the FAR. Specifically, buffering is problematic since the FAR or DAG root would be required to buffer all traffic for a specified timeout or else additional acknowledgment mechanisms are necessary to assist in clearing buffer space. In applications where the FAR must operate with constrained resources, buffering all messages destined to LLN devices may not be feasible at all. Of course, one downside is that if the ICMPv6 Destination Unreachable message does not make it back to the DAG Root, then the DAG Root does not have the opportunity to retransmit the message. But this is true for any NACK-based scheme. The ACK-based schemes, on the other hand, generally add too much traffic overhead and (as mentioned before) the buffering requirements may be infeasible.

While there have been shown and described illustrative embodiments that provide for seamless multipath retransmission using source-routed tunnels in a communication network, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks and/or protocols. In addition, while certain protocols are shown, such as RPL or more particularly RFC 6554, other suitable protocols may be used, accordingly. Also, while the techniques generally describe initiation and determinations by a FAR or DAG root, other devices capable of source routing messages may be configured to utilize the techniques herein as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
encapsulating and transmitting an original packet toward a destination in a computer network, wherein the original packet is encapsulated with a tunnel header indicating a first source route toward the destination;
receiving a destination unreachable message originated by a particular node along the first source route, the destination unreachable message carrying the encapsulated packet as received by the particular node, wherein the particular node operates in a non-storing mode in which the particular node does not store a routing path to the destination;
determining a failed link along the first source route based on the tunnel header and the particular node;
determining an alternate source route to the destination without the failed link;
re-encapsulating and re-transmitting the original packet on an alternate source route, wherein the original packet is re-encapsulated with a new tunnel header indicating the alternate source route;
determining that no alternate source route exists; and
in response, returning a second destination unreachable message to a source of the original packet, the second destination unreachable message carrying the original packet with the restored original hop limit count.

2. The method as in claim 1, further comprising:
encapsulating and transmitting the original packet toward the destination with the tunnel header additionally having a hop limit count related to a number of tunnel hops in the first source route, the original packet having an adjusted hop limit count set to an original hop limit count of the original packet less the hop limit count of the tunnel header;
restoring the original hop limit count of the original packet in response to the received destination unreachable message by adding the adjusted hop limit count of the original packet as found in the received destination unreachable message to the number of tunnel hops in the first source route; and
re-encapsulating and re-transmitting the original packet on the alternate source route, wherein the original packet is re-encapsulated with the new tunnel header having a new hop limit count related to a new number of tunnel hops in the alternate source route, the original packet having a new adjusted hop limit count set to the restored original hop limit count less the new hop limit count of the new tunnel header.

3. The method as in claim 1, wherein the destination unreachable message is an Internet Control Message Protocol version 6 (ICMPv6) destination unreachable message.

4. The method as in claim 1, wherein the encapsulation and re-encapsulation are based on an Internet Protocol version 6 (IPv6)-in-IPv6 tunneling protocol.

5. The method as in claim 1, wherein the destination unreachable message is limited to information required to determine the failed link and the original packet.

6. The method as in claim 5, wherein the information required to determine the failed link is one of either a) the tunnel header and the first source route; or b) an explicit indication of the failed link.

7. The method as in claim 5, wherein the destination unreachable message is limited in response to the encapsulated packet not fitting within a maximum transmission unit (MTU) when carried within the destination unreachable message.

8. The method as in claim 1, further comprising:
fragmenting the original packet based on a maximum transmission unit (MTU) in consideration of a destination unreachable message to ensure that the entire original packet plus the tunnel header plus the first source route fits within the MTU when returned in a destination unreachable message.

9. An apparatus, comprising:
one or more network interfaces to communicate with a computer network;
a processor coupled to the network interfaces and adapted to execute one or more processes; and
a memory configured to store a process executable by the processor, the process when executed operable to:
encapsulate and transmit an original packet toward a destination in a computer network, wherein the original packet is encapsulated with a tunnel header indicating a first source route toward the destination;
receive a destination unreachable message originated by a particular node along the first source route, the destination unreachable message carrying the encapsulated packet as received by the particular node, wherein the particular node operates in a non-storing mode in which the particular node does not store a routing path to the destination;
determine a failed link along the first source route based on the tunnel header and the particular node;
determine an alternate source route to the destination without the failed link;
re-encapsulate and re-transmit the original packet on an alternate source route, wherein the original packet is re-encapsulated with a new tunnel header indicating the alternate source route;
determining that no alternate source route exists; and
in response, returning a second destination unreachable message to a source of the original packet, the second destination unreachable message carrying the original packet with the restored original hop limit count.

10. The apparatus as in claim 9, wherein the process when executed is further operable to:
encapsulate and transmit the original packet toward the destination with the tunnel header additionally having a hop limit count related to a number of tunnel hops in the first source route, the original packet having an adjusted hop limit count set to an original hop limit count of the original packet less the hop limit count of the tunnel header;
restore the original hop limit count of the original packet in response to the received destination unreachable message by adding the adjusted hop limit count of the original packet as found in the received destination unreachable message to the number of tunnel hops in the first source route; and
re-encapsulate and re-transmit the original packet on the alternate source route, wherein the original packet is re-encapsulated with the new tunnel header having a new hop limit count related to a new number of tunnel hops in the alternate source route, the original packet having a new adjusted hop limit count set to the restored original hop limit count less the new hop limit count of the new tunnel header.

11. The apparatus as in claim 9, wherein the destination unreachable message is an Internet Control Message Protocol version 6 (ICMPv6) destination unreachable message.

12. The apparatus as in claim 9, wherein the encapsulation and re-encapsulation are based on an Internet Protocol version 6 (IPv6)-in-IPv6 tunneling protocol.

13. The apparatus as in claim 9, wherein the destination unreachable message is limited to information required to determine the failed link and the original packet.

14. The apparatus as in claim 9, wherein the information required to determine the failed link is one of either a) the tunnel header and the first source route; or b) an explicit indication of the failed link.

15. The apparatus as in claim 14, wherein the destination unreachable message is limited in response to the encapsulated packet not fitting within a maximum transmission unit (MTU) when carried within the destination unreachable message.

16. The apparatus as in claim 9, wherein the process when executed is further operable to:
fragment the original packet based on a maximum transmission unit (MTU) in consideration of a destination unreachable message to ensure that the entire original packet plus the tunnel header plus the first source route fits within the MTU when returned in a destination unreachable message.

17. A tangible, non-transitory, computer-readable media having software encoded thereon, the software when executed by a processor operable to:
encapsulate and transmit an original packet toward a destination in a computer network, wherein the original packet is encapsulated with a tunnel header indicating a first source route toward the destination;
receive a destination unreachable message originated by a particular node along the first source route, the destination unreachable message carrying the encapsulated packet as received by the particular node, wherein the particular node operates in a non-storing mode in which the particular node does not store a routing path to the destination;
determine a failed link along the first source route based on the tunnel header and the particular node;
determine an alternate source route to the destination without the failed link;
re-encapsulate and re-transmit the original packet on an alternate source route, wherein the original packet is re-encapsulated with a new tunnel header indicating the alternate source route;
determining that no alternate source route exists; and
in response, returning a second destination unreachable message to a source of the original packet, the second destination unreachable message carrying the original packet with the restored original hop limit count.

18. The computer-readable media as in claim 17, wherein the software when executed is further operable to:
encapsulate and transmit the original packet toward the destination with the tunnel header additionally having a hop limit count related to a number of tunnel hops in the first source route, the original packet having an adjusted hop limit count set to an original hop limit count of the original packet less the hop limit count of the tunnel header;
restore the original hop limit count of the original packet in response to the received destination unreachable message by adding the adjusted hop limit count of the original packet as found in the received destination unreachable message to the number of tunnel hops in the first source route; and
re-encapsulate and re-transmit the original packet on the alternate source route, wherein the original packet is re-encapsulated with the new tunnel header having a new hop limit count related to a new number of tunnel hops in the alternate source route, the original packet having a new adjusted hop limit count set to the restored original hop limit count less the new hop limit count of the new tunnel header.

* * * * *